(12) United States Patent
Bixel et al.

(10) Patent No.: US 6,384,565 B1
(45) Date of Patent: May 7, 2002

(54) METHOD AND APPARATUS FOR DERIVING CHARACTERISTICS OF A UTILITY SIGNAL IN AN AC MACHINE DRIVE SYSTEM

(75) Inventors: Paul Scott Bixel, Salem; Richard William Carter, Roanoke; Barry Earle Dick, Salem, all of VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/455,470

(22) Filed: Dec. 6, 1999

(51) Int. Cl.$^7$ ................................. H02P 1/46
(52) U.S. Cl. ................... 318/727; 318/723; 318/722; 318/802; 318/810; 318/798; 318/799; 318/800
(58) Field of Search ................ 318/723, 722, 318/802, 810, 798, 799, 800

(56) References Cited

U.S. PATENT DOCUMENTS

| | | | |
|---|---|---|---|
| 3,665,495 A | * 5/1972 | Carter et al. | 318/723 |
| 3,764,815 A | 10/1973 | Habock et al. | 290/52 |
| 3,794,846 A | * 2/1974 | Schlicher et al. | 318/723 |
| 3,887,820 A | 6/1975 | Glennon | 307/87 |
| 4,258,302 A | * 3/1981 | Plunkett | 318/723 |
| 4,587,474 A | 5/1986 | Espelage et al. | 318/709 |
| 4,931,715 A | * 6/1990 | Lee et al. | 318/709 |

FOREIGN PATENT DOCUMENTS

| | | | |
|---|---|---|---|
| DE | 31 13 564 A1 | 10/1982 | H02P/7/42 |
| DE | 42 04 677 C1 | 6/1993 | H02P/7/63 |
| FR | 2 718 581 A1 | 10/1995 | H02P/1/46 |

OTHER PUBLICATIONS

Patent Abstracts of Japan, vol. 1999, No. 12, Oct. 29, 1999 & JP 11 178377 A (Nishishiba Electric Co LTD) Jul. 2, 1999 –abstract.
International Search Report.

* cited by examiner

Primary Examiner—Karen Masih
(74) Attorney, Agent, or Firm—Hunton & Williams; Kevin T. Duncan

(57) ABSTRACT

A method and apparatus for deriving characteristics of a utility signal for synchronizing the output of a motor drive with the utility for a transfer or capture operation. With the drive in idle, the voltage and phase angle of an input to the drive are detected by instrumentation of the drive. The voltage and phase angle of a signal from a utility are detected by instrumentation of the drive at the output of the drive. A phase angle difference and scaling factor are determined to correlate the input signal to the motor drive with the signal at the output of the motor drive. The phase angle difference and scaling factor are stored and subsequently used to derive the signal at the motor due to the utility at the time of the transfer or capture procedure.

29 Claims, 3 Drawing Sheets and controller 20 (serving as a logic device). Controller 20 may be a microprocessor-based device or the like and includes appropriate programming or logic for performing the procedures described below.

METHOD AND APPARATUS FOR DERIVING CHARACTERISTICS OF A UTILITY SIGNAL IN AN AC MACHINE DRIVE SYSTEM

BACKGROUND OF THE INVENTION

The invention relates to switching of an AC machine between power from different sources, such as power from supply mains of a power utility and power from a machine drive, such as a variable frequency AC motor drive. More specifically, the invention relates to a method and apparatus for deriving a line transfer reference signal to determine characteristics, such as the phase and magnitude, of the utility or other power supply for synchronizing the phase and magnitude of the two power supplies without the need for an external sensor.

In many applications, it is desirable to switch an AC machine receiving power directly from supply mains to receive power from a drive, or vice versa. The phrase "supply mains", as used herein, refers to any source of AC electric power having a frequency that is determined by the power utility. The term "drive" as used herein refers to any source of AC electric power having a frequency that is generated by a mechanism other than the power utility, such as a three phase AC variable frequency motor drive, a smart motor starter, or the like. The phrase "AC machine", as used herein refers to any AC rotating machine, such as an inductance motor, a synchronous motor, a generator, a dynamo or the like.

For example, in gas turbine static starters, a variable frequency motor drive is often used to bring a generator motor up to a self-sustaining speed at which the generator motor can subsequently be switched to supply mains. In other applications, such as variable speed fans and pumps, it is desirable to achieve variable speed with a variable frequency drive and subsequently switch the motor to supply mains for sustained operation at a constant high speed. Also, in the event of failure of the motor drive, it is desirable to switch the motor to the supply mains to continue operation. Similarly, it is often desirable to switch a motor from supply mains back to a motor drive for slowing the motor down or otherwise varying the speed or torque of the motor.

It is well known to synchronize the phase and magnitude of signals from supply mains and a drive to accomplish a "bumpless" transfer. However, known techniques for synchronization require an external sensor for detecting zero crossings or magnitude and phase of the utility. Of course, the use of an external sensor increases the cost and complexity of the system. Also, the external sensor may itself contribute to phase differences further complicating the system. U.S. Pat. No. 5,587,474 discloses a control system in which the phase difference of an input PLL and an output PLL of an inverter is driven to zero to synchronize output of the inverter to output of supply mains. However, this system is extremely complex. Also, there are applications in which synchronization should be accomplished between a motor drive output and sources other than the supply mains powering the motor drive. The system disclosed in U.S. Pat. No. 5,587,474 is not readily adapted to such synchronization. Switching of a motor from a motor drive to supply mains is referred to "transfer" herein and switching of a motor from supply mains to a motor drive is referred to as a "capture" herein.

BRIEF SUMMARY OF THE INVENTION

A first aspect of the invention is directed to a method for deriving characteristics of a signal from a utility in an AC machine drive system. The method comprises sending an input signal to a drive while the drive is idle, and sending a signal from a utility to a an AC machine coupled to an output of the drive. Additionally, characteristic of a signal is detected at the output of the drive while the drive is idle and characteristic of the signal is detected from the utility. Next, the characteristic of the signal at the output of the drive is compared to the characteristic of the signal from the utility to determine a characteristic adjustment. Finally, the characteristic adjustment is applied to the characteristic of the signal from the utility to derive a characteristic of a signal at the AC machine due to the utility.

A second aspect of the invention is directed to a drive system capable of switching an AC machine between power from a drive and power from a utility. The drive system includes a utility, a drive, an AC machine, a utility contactor coupled between the utility and the AC machine to selectively couple an output of the utility to the AC machine, a drive contactor coupled between the drive and the AC machine to selectively couple an output of the drive to the AC machine, and a controller. The controller is operative to detect a characteristic of a signal at the output of the drive due to power from the utility when the drive is idle and the utility contactor and the drive contactor are closed. The controller is also operative to detect a characteristic of the utility feed to the AC machine and compare the characteristic of the signal at the output of the drive to the characteristic of the signal from the utility to determine a characteristic adjustment.

A third aspect of the invention is directed to an apparatus for deriving characteristics of a signal from a utility in an AC machine drive system. The system comprises structure for sending a signal from a utility to an AC machine coupled to an output of the drive, structure for detecting the characteristic of a signal at the output of the drive due to the power from the utility, and a means for detecting a characteristic of the signal from the utility. The system also includes structure for comparing the characteristic of the signal at the output of the drive to the characteristic of the signal from the utility to determine a characteristic adjustment, and structure for applying the characteristic adjustment to the characteristic of the signal from the utility to derive a characteristic of a signal at the AC machine due to the utility.

BRIEF DESCRIPTION OF THE DRAWINGS

The invention is described herein through a preferred embodiment and the drawing in which.

DETAILED DESCRIPTION OF THE INVENTION

Figure 1:
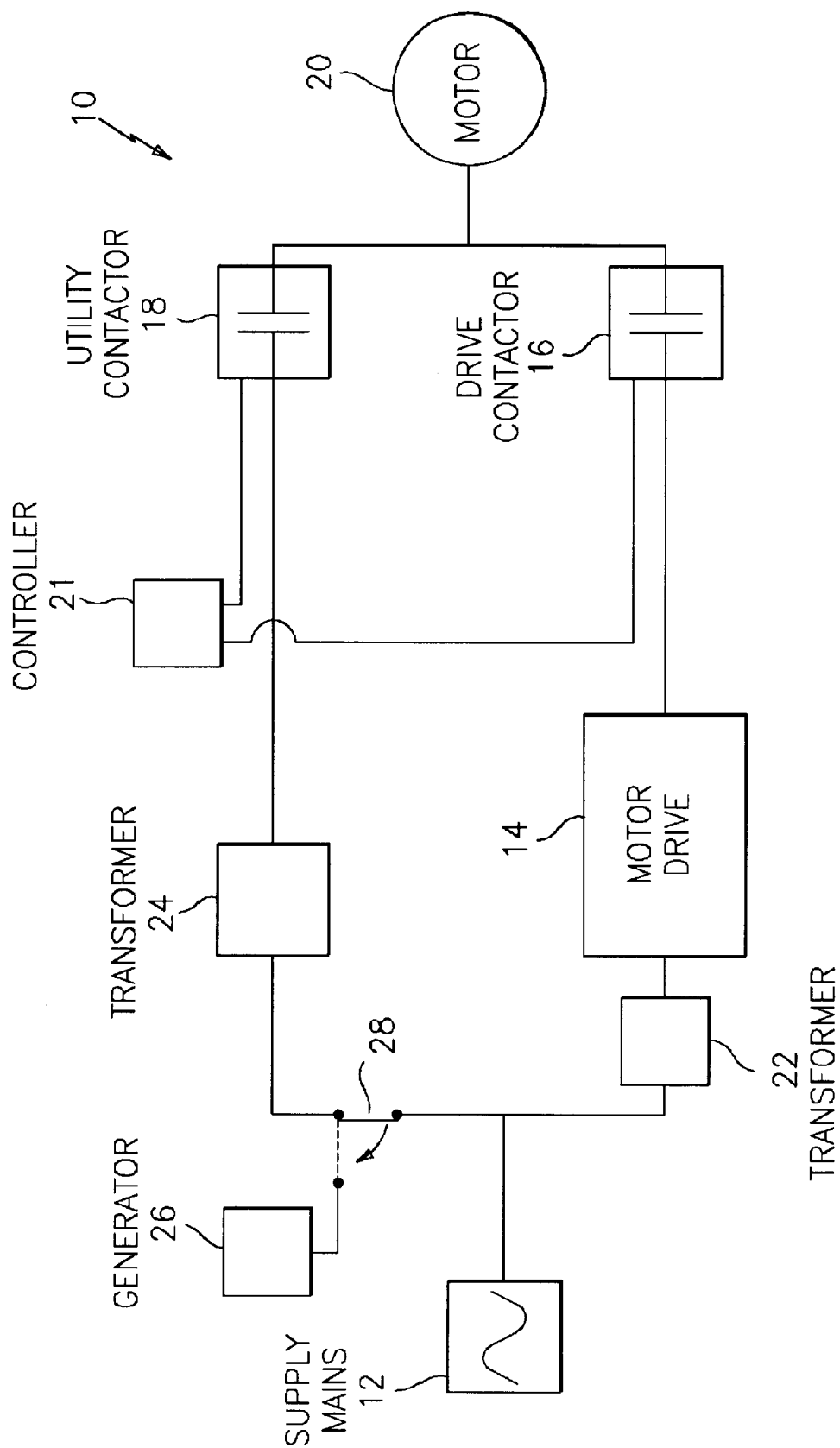
FIG. 1 is a schematic illustration of a drive switching system in accordance with a preferred embodiment of the invention.

FIG. 1 illustrates a drive switching system in accordance with a preferred embodiment. System 10 includes supply mains 12 (i.e., a utility), a source of three phase AC power at frequency f, variable frequency AC motor drive 14, drive output contactor 16 (serving as a switching mechanism), utility contactor 18 (also serving as a switching mechanism), and motor 20 as an AC machine. It can be seen that operation of contactors 18 and 16 can be controlled to selectively couple motor 20 to a utility, to motor drive 14, or to both. Controller 21 is operatively coupled to contactors 16 and 18 to control the state of contactors 16 and 18 in a desired manner. Controller 21 can be a microprocessor based device programmed in a desired manner, a hardwired analog logic circuit, or any other mechanism for controlling contactors 16 and 18 in the manner described below. The preferred embodiment also includes transformers 22 and 24, and generator 26, as an alternative utility. Switch 28 selectively couples motor 20 to supply mains 12 or generator 26 as the utility. Controller 21 is illustrated as a component separate from motor drive 14. However, controller 21 can be integral to motor drive 14 and can be used to accomplish switching of the bridges of an inverter in motor drive 14 as well as the control disclosed herein.

Figure 2:
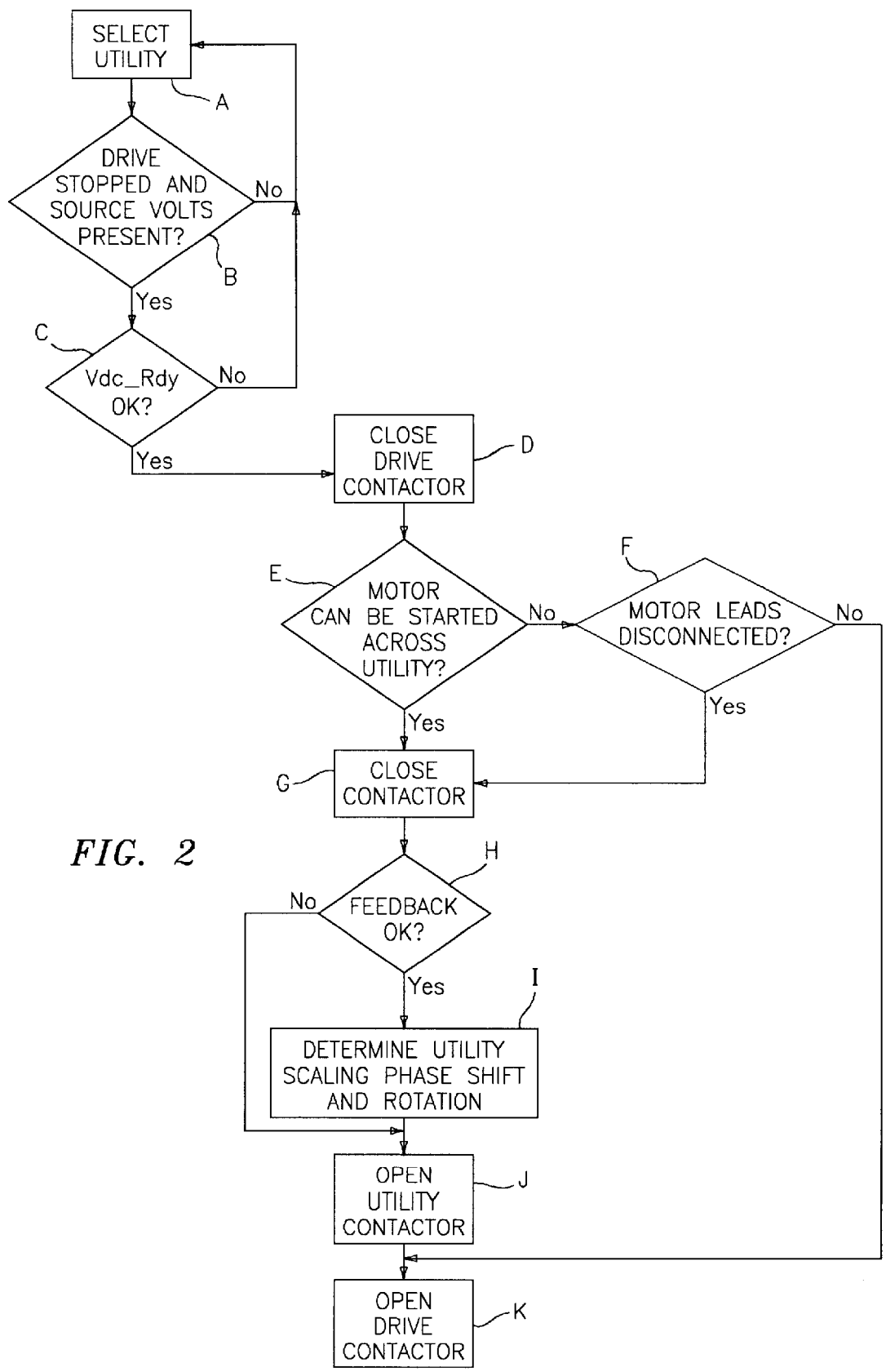
FIG. 2 is a flow chart of the procedure for determining a scaling factor and phase shift for synchronization of the preferred embodiment.

The preferred embodiment utilizes existing instrumentation of motor drive 140 to derive characteristics, e.g. the magnitude and phase, of the utility at contactor 18 by determining a scaling factor and phase shift of the utility with respect to motor drive 18. The term "utility" as used herein refers to any power supply, such as supply mains 12, generator 26, another supply mains, or the like. In this manner, motor drive 14 can be controlled to have an output of the same magnitude and phase as the utility. FIG. 2 is a flow chart of the procedure for determining a scaling factor and phase shift for synchronization.

In step A, the utility is selected to which synchronization is to be accomplished for transfer or capture. For example, supply mains 12 or generator 26 can be selected by operating switch 28 under control of controller 21 or manually. Assuming that supply mains 12 is selected, switch 28 will be placed in the state illustrated by the solid line in FIG. 1. In step B it is determined if motor drive 14 is idle, i.e. is not generating an output signal, and if motor drive 14 has input, i.e. source, voltage from supply mains 12. Step B can be accomplished using existing conventional instrumentation in drive 14. For example, voltage detection instrumentation is often provided to monitor the voltage and frequency of the supply mains. Of course, the drive must be idle and must have source voltage at its input to begin the procedure. Therefore, if the answer is step B is "No", the procedure returns to step A to reselect the utility and correct any other anomalies.

Assuming the answer in step B is "Yes", the procedure proceeds to step C in which internal instrumentation of motor drive 14 is used to detect if the DC bus of drive 14 is fully charged. If the DC bus is not fully charged, closure of contactors 16 and 18 could damage motor drive 14. Accordingly, if the DC bus is not fully charged, the procedure returns to step A to reselect the utility and correct any other anomalies. Assuming the DC bus is fully charged, the procedure proceeds to step D in which drive contactor 16 is closed, if it is not already closed. In step E, it is determined if the motor can be line started, i.e. started with utility voltage, without damage. This determination is made based on motor ratings and load in a known manner. If the motor cannot be line started, the motor leads are disconnected and this is verified in step F. If the motor leads cannot be disconnected for some reason, the procedure proceeds to step K in which drive contactor 16 is opened and the procedure ends to avoid motor damage. If the motor leads are disconnected, the procedure continues to step G. Similarly, if in step E, it is determined that the motor can be line started, the procedure continues to step G.

In step G, utility contactor 18 is closed. In step H, it is determined if feedback is being received at the output of motor drive 14 by using existing output instrumentation in motor drive 14. The feed back is the signal from supply mains 12 after passing through transformer 24, contactor 18, contactor 16, and any other components in the circuit. The determination in step H can merely be detection of a voltage or can include parameters such as minimum and maximum values of the voltage that will be deemed to be acceptable as a valid feed back.

If an acceptable feedback is not being received at the output of motor drive 14, the procedure proceeds to step J in which utility contactor 18 is opened and step K in which drive contactor 16 is opened. At this time diagnostics can be accomplished to determine why acceptable feedback was not received. Assuming that an acceptable feedback is received in step H, the utility scaling factor and phase shift are determined in step I and the procedure ends by opening utility contactor 14 in step J and drive contactor 16 in step K.

Figure 3:
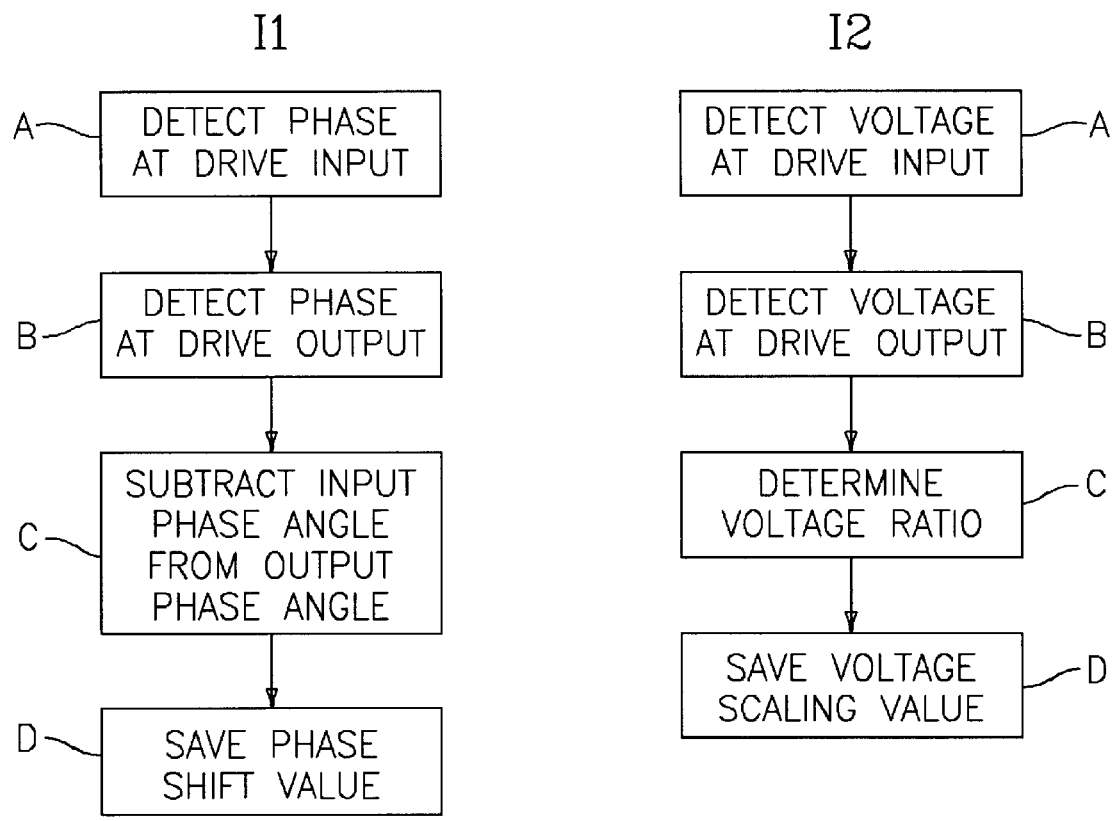
FIG. 3 is a flow chart of the phase shift determination sub-procedure and the scaling factor determination sub-procedure of the preferred embodiment.

FIG. 3 illustrates sub-procedures I1 and I2 of step I for determining the phase shift and scaling factor respectively. In step A of sub-procedure J1, the phase of the input signal of motor drive 14 is detected as a characteristic using existing instrumentation of drive 14. For example, the source phase locked loop (PLL) can be used to determine the phase of the source signal in a known manner. The source signal to drive 14 is the signal from the utility, supply mains 12 in this case, after having passed through transformer 22 and any other components in the circuit. In step B, the phase at the output of motor drive 14 is detected as a characteristic using existing instrumentation of drive 14. For example, the motor flux phase locked loop (PLL) can be used to determine the phase at the output in a known manner. Note that motor drive 14 is idle, i.e. not producing an output signal, and thus the signal at the output of motor drive 14 is the signal from the utility, supply mains 12 in this case, after having passed through transformer 24, contactor 18, and any other components in the circuit. In step C, the phase difference between the phase angles determined in steps A and B is calculated by the controller of motor drive 14 and the resulting phase shift value is stored in a memory register of the controller in step D.

In step A of sub-procedure J2, the voltage of the input signal of motor drive 14 is detected as a characteristic using existing instrumentation of drive 14. For example, the input protection circuitry can be used to determine the phase of the input signal in a known manner. The input signal to drive 14 is the signal from the utility, supply mains 12 in this case, after having passed through transformer 22 and any other components in the circuit. In step B, the voltage at the output of motor drive 14 is detected as a characteristic using existing instrumentation of drive 14. For example, the output voltage monitoring circuitry can be used to determine the phase at the output in a known manner. Note that motor drive 14 is idle, i.e. not producing an output signal, and thus the signal at the output of motor drive 14 is the signal from the utility, supply mains 12 in this case, after having passed through transformer 24, contactor 18, and any other components in the circuit. In step C, the ratio between the voltages determined in steps A and B is calculated by the controller of motor drive 14 and the resulting scaling factor is stored in a memory register of the controller in step D.

It can be seen that the scaling factor is characteristic adjustment comprising a multiplier which can be used to determine the voltage of the input of motor 20 from the utility based on the voltage at the input of motor drive 14 as long as components in the circuit are not changed. Similarly, the phase difference is a characteristic adjustment that can be used to determine the phase angle of the input of motor 20 from the utility based on the phase angle at the input of motor drive 14 as long as components in the circuit are not changed. Accordingly, once the scaling factor and phase difference for a particular system are determined and saved in memory, the switching bridges of motor drive 14 can be controlled to provide an output signal that matches the voltage and phase of motor input due to the utility merely by measuring the voltage and phase of the input of motor drive 14 using existing drive instrumentation and adjusting characteristics of the input to derive characteristics of the utility. The drive source voltage can be multiplied by the scaling factor and the drive source phase angle can be added to the phase shift to determine the voltage and phase at the motor due to the signal from the utility. This permits the output voltage and phase of the motor drive 14 to be matched to those of utility 12. The phase shift and scaling factor need only be determined once for any particular system. However, these values can be recalculated at any time if a change is made to the system or under any other circumstances.

In the event that the utility to be transferred to is other than the supply mains supplying the input to the motor drive, such as generator 26, the determination procedure can be conducted with switch 28 in the position illustrated by the dotted line in FIG. 1 by selecting generator 26 in step A of FIG. 1. It may be necessary to use an external sensor to detect the voltage and phase of generator 26 instead of measuring the voltage and phase of the input of motor drive 14. Otherwise the procedure is similar to that described in detail above. All procedures can be accomplished in response to software instructions programmed into the controller of the motor drive or an external device. Also, the procedures can be accomplished in response to manual prompts and actions. The invention can be applied to any type of drive, any type of utility, and any type of AC machine. Any type of switching mechanisms can be used. Any synchronization method or apparatus can be used in connection with the invention.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A method for deriving characteristics of a signal from a utility in an AC machine drive system, said method comprising the steps of:
   sending an input signal to a drive while the drive is idle;
   sending a signal from a utility to an AC machine coupled to an output of the drive;
   detecting a characteristic of a signal at the output of the drive while the drive is idle;
   detecting a characteristic of the signal from the utility;
   comparing the characteristic of the signal at the output of the drive to the characteristic of the signal from the utility to determine a characteristic adjustment; and
   applying the characteristic adjustment to the characteristic of the signal from the utility to derive a characteristic of a signal at the AC machinery due to the utility.

2. A method as recited in claim 1, further comprising the step of synchronizing the output of the drive when not in an idle mode with the signal from the utility by adjusting the output of the drive to match the characteristic of the signal at the AC machine obtained during said applying step.

3. A method as recited in claim 1, wherein said step of detecting a characteristic of the signal from the utility comprises detecting the voltage and the phase angle at the output of the drive and said step of detecting a characteristic of the input signal comprises detecting the voltage and phase angle of the utility.

4. A method as recited in claim 3, wherein said step of comparing comprises calculating the ratio between the voltage at the output of the drive and the voltage of the utility to determine a scaling factor as the characteristic adjustment.

5. A method as recited in claim 3, wherein said step of comparing comprises calculating the difference between the phase angle at the output of the drive and the phase angle of the utility to determine a phase angle difference as the characteristic adjustment.

6. A method as recited in claim 4, wherein said step of comparing comprises calculating the difference between the phase angle at the output of the drive and the phase angle of the utility to determine a phase angle difference as the characteristic adjustment.

7. A method as recited in claim 6, wherein the input signal originates at the utility and said step of detecting a characteristic of the signal from the utility comprises detecting a characteristic of the input signal with input instrumentation of the drive.

8. A method as recited in claim 7, wherein the characteristic of the input signal is different from a characteristic of the utility due to components between the utility and the input of the drive.

9. A method as recited in claim 7, wherein the characteristic of the signal of the output of the drive is different from a characteristic of the utility due to components between the utility and the output of the drive.

10. A method as recited in claim 1, wherein said step of sending a signal from a utility comprises sending an input signal to a motor.

11. A drive system capable of switching an AC machine between power from a drive and power from a utility, said system comprising:
    a utility;
    a drive;
    an AC machine;
    a utility contactor coupled between said utility and said AC machine to selectively couple an output of said utility to said AC machine;
    a drive contactor coupled between said drive and said AC machine to selectively couple an output of said drive to said AC machine;
    a controller operative to detect a characteristic of a signal at the output of said drive due to power from said utility when said drive is idle and said utility contactor and said motor drive contactor are closed, said controller also being operative to detect a characteristic of a utility feed to said AC machine and compare the characteristic of the signal at the output of said drive to the characteristic of the signal from said utility to determine a characteristic adjustment.

12. A system as recited in claim 11, wherein said controller is operative to synchronize an output of said drive when not in an idle mode with a signal at said AC machine from said utility by adjusting the output of said drive to match the characteristic of said utility adjusted by the characteristic adjustment.

13. A system as recited in claim 12, wherein the characteristic of the signal at the output of the drive comprises the voltage and the phase angle of the signal at the output of said drive and the characteristic of the utility comprises the voltage and phase angle of the utility.

14. A system as recited in claim 13, wherein the characteristic adjustment comprises a scaling factor and a phase angle difference.

15. A system as recited in claim 14, wherein the scaling factor is the ratio between the voltage of the signal at the output of said drive and the voltage of said utility.

16. A system as recited in claim 14, wherein the phase angle difference is the difference between the phase angle of the signal at the output of said drive and the phase angle of said utility.

17. A system as recited in claim 16, wherein said utility is coupled to the input of said drive and said controller is coupled to input instrumentation of said drive to detect a characteristic of said utility at the input of said drive.

18. A system as recited in claim 10, further comprising power converting components between said utility and the output of said drive.

19. A system as recited in claim 16, further comprising power converting components between said utility and the input of said drive.

20. An apparatus as recited in claim 19, wherein said means for providing a signal from a utility is coupled to an input of the drive and said means for detecting a characteristic signal from the utility comprises input instrumentation of the drive.

21. An apparatus as recited in claim 20, further comprising power converting components between the utility and the input of the drive.

22. An apparatus for deriving characteristics of a signal from a utility in an AC machine drive system, said apparatus comprising:

means for sending a signal from a utility, via a means for phase shifting, to an AC machine coupled to an output of the drive;

means for detecting the characteristic of a signal at the output of the drive due to the power from the utility;

means for detecting a characteristic of the signal from the utility;

means for comparing the characteristic of the signal at the output of the drive to the characteristic of the signal from the utility to determine a characteristic adjustment; and means for applying the characteristic adjustment to the characteristic of the signal from the utility to derive a characteristic of a signal at the AC machine due to the utility.

23. An apparatus as recited in claim 22, further comprising means for synchronizing the output of the drive when not in an idle mode with the signal from the utility by adjusting the output of the drive to match the characteristic of the signal of the AC machine derived by said means for applying.

24. An apparatus as recited in claim 22, wherein said means for detecting a characteristic at the output of the rive comprises means for detecting the voltage and the phase angle at the output of the drive and said means for detecting a characteristic of the signal from the utility comprises means for detecting the voltage and the phase angle of the utility.

25. An apparatus as recited in claim 24, wherein said means for comparing comprises means for calculating the ratio between the voltage at the output of the drive and the voltage of the utility to determine a scaling factor.

26. An apparatus as recited in claim 24, wherein said means for comparing comprises means for calculating the difference between the phase angle at the output of the drive and the phase angle of the utility to determine a phase angle difference.

27. An apparatus as recited in claim 25, wherein said means for comparing comprises means for calculating the difference between the phase angle at the output of the drive and the phase angle of the utility to determine a phase angle difference.

28. An apparatus as recited in claim 22, further comprising power concerning components between the utility and the output of the drive.

29. The apparatus as recited in claim 22, wherein the means for phase shifting comprises a transformer.

* * * * *